United States Patent [19]

Greenslade

[11] Patent Number: 4,936,024
[45] Date of Patent: Jun. 26, 1990

[54] RECESS MEASURING DEVICE

[76] Inventor: Joe E. Greenslade, 4311 Pheasant Walk, Fort Worth, Tex. 76133

[21] Appl. No.: 427,770
[22] Filed: Oct. 26, 1989
[51] Int. Cl.⁵ ............................ G01B 3/28; G01B 7/26
[52] U.S. Cl. ........................................ 33/836; 33/832; 33/556
[58] Field of Search ................ 33/826, 832, 833, 836, 33/548, 501, 501.6, 556, 558

[56] References Cited

U.S. PATENT DOCUMENTS

| | | | |
|---|---|---|---|
| 1,370,310 | 3/1921 | Gustavson | 33/828 |
| 1,928,528 | 9/1933 | Gagnon | 33/542 |
| 1,966,618 | 7/1034 | Egorenkov | 33/836 |
| 2,193,939 | 2/1938 | Sanford | 33/827 |
| 2,287,097 | 6/1942 | Graham | 33/827 |
| 2,439,565 | 4/1948 | Egor | 33/542 |
| 3,292,678 | 12/1965 | Noga | 81/475 |
| 4,631,831 | 12/1986 | Bacher et al. | 33/836 |
| 4,765,064 | 8/1988 | Maeda | 33/832 |
| 4,791,728 | 12/1988 | Van Sickle et al. | 33/501.09 |
| 4,809,440 | 3/1989 | Rutter | 33/828 |

Primary Examiner—William A. Cuchlinski, Jr.
Assistant Examiner—Alvin Wirthlin
Attorney, Agent, or Firm—Charles D. Gunter, Jr.

[57] ABSTRACT

A recess indicator is shown having an indicator shaft which is reciprocated to record characteristics of a recess to be measured. An adapter sleeve has one end which is joined to the indicator with the indicator shaft received within the interior thereof. A housing is provided which carries a gaging element with the gaging element extending from one end thereof and has a bushing which extends from the opposite end thereof. The bushing can be releasably joined to the adapter sleeve to allow for the interchange of different gaging elements.

3 Claims, 2 Drawing Sheets

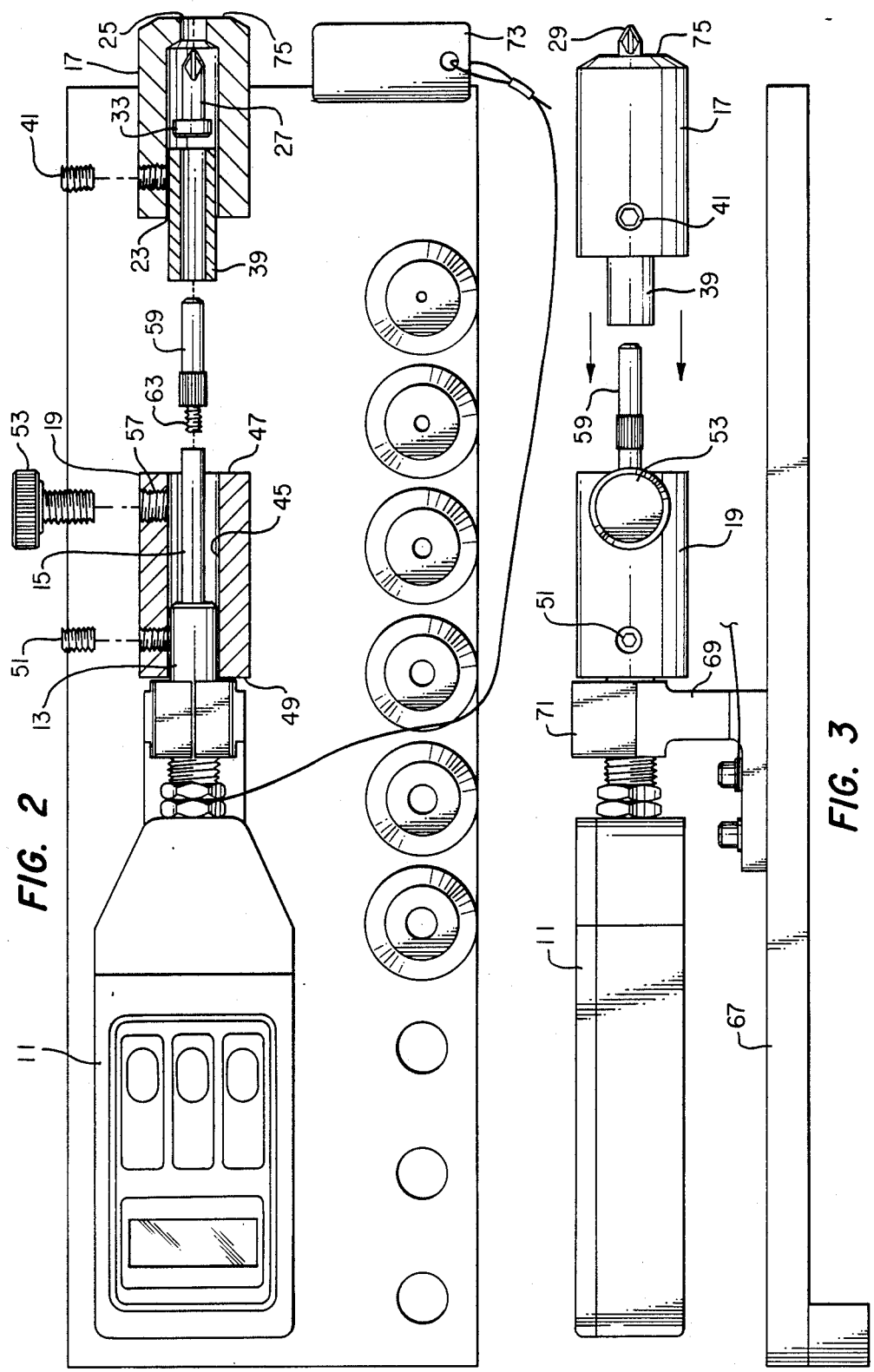

RECESS MEASURING DEVICE

BACKGROUND OF THE INVENTION

1. Field of the Invention

The present invention relates to devices for measuring recesses in objects, specifically for measuring the depth of a blind hole in a part, such as semitubular rivet hole, a slot or screw head recess.

2. Description of the Prior Art

Various slot and recess measuring devices are known in the prior art which feature an electronic or dial indicator having an outwardly extending indicator shaft, the electronic indicator being actuable by the reciprocal movement of the indicator shaft to record characteristics of the recess being measured A gaging element assembly was typically fitted to the indicator shaft and included a gaging element specifically adapted for the particular recess to be measured, e.g., slot depth, rivet extrusion depth, phillips screw head recess, square recess, hex recess, etc. As many as thirty different gaging elements were required for performing typical measuring operations on screws and other fasteners.

In the past, there has been no simple and convenient method for interchanging the gaging elements As a result, the user was typically required to buy an electronic or dial indicator for each of the different gaging elements required. Where interchangeable gaging element assemblies were available, the gaging element was typically not captivated during the interchange operation. As a result, the gaging element could be dropped or lost.

The present invention has as its object to provide a recess measuring device of the type having an indicator and an associated gaging element assembly which allows quick and easy interchange of a variety of gaging elements, depending upon the job at hand.

Another object of the invention is to provide an interchangeable gaging element assembly in which the gaging element is securely retained within the assembly during the interchange operation.

Another object of the invention is to design such a device which is simple in construction and economical to manufacture.

Additional objects, features and advantages will be apparent in the written description which follows.

SUMMARY OF THE INVENTION

The recess measuring device of the invention includes a recess indicator having an indicator shaft which extends therefrom. The recess indicator is actuable by the reciprocal movement of the indicator shaft to record characteristics of the recess being measured. The device includes a gaging element housing having an interior bore and opposite end openings. A gaging element is carried by the housing within the interior bore and normally extends at least partly from one of the end openings. A bushing extends from the housing opposite the gaging element and is also provided with an internal bore. An adapter sleeve has opposing ends, one of the ends being joined to the indicator with the indicator shaft being received within the interior thereof. The other of the ends is joined to the housing by means of the bushing. An indicator extension extends from the indicator shaft of the measuring device through the internal bore of the bushing and into contact with the gaging element, whereby movement of the gaging element moves the indicator shaft to thereby actuate the recess indicator. Releasable means, such as a thumb screw, are provided for releasably joining the housing to the adapter sleeve, whereby a plurality of interchangeable gaging element housings can be joined to the adapter sleeve quickly and easily.

BRIEF DESCRIPTION OF THE DRAWINGS

FIG. 2 is a top, view of the recess measuring device of the invention showing the gaging element housing and adapter sleeve partially in cross-section and in exploded fashion; and FIG. 3 is a side, view of the measuring device of FIG. 2.

DETAILED DESCRIPTION OF THE INVENTION

Figure 1:
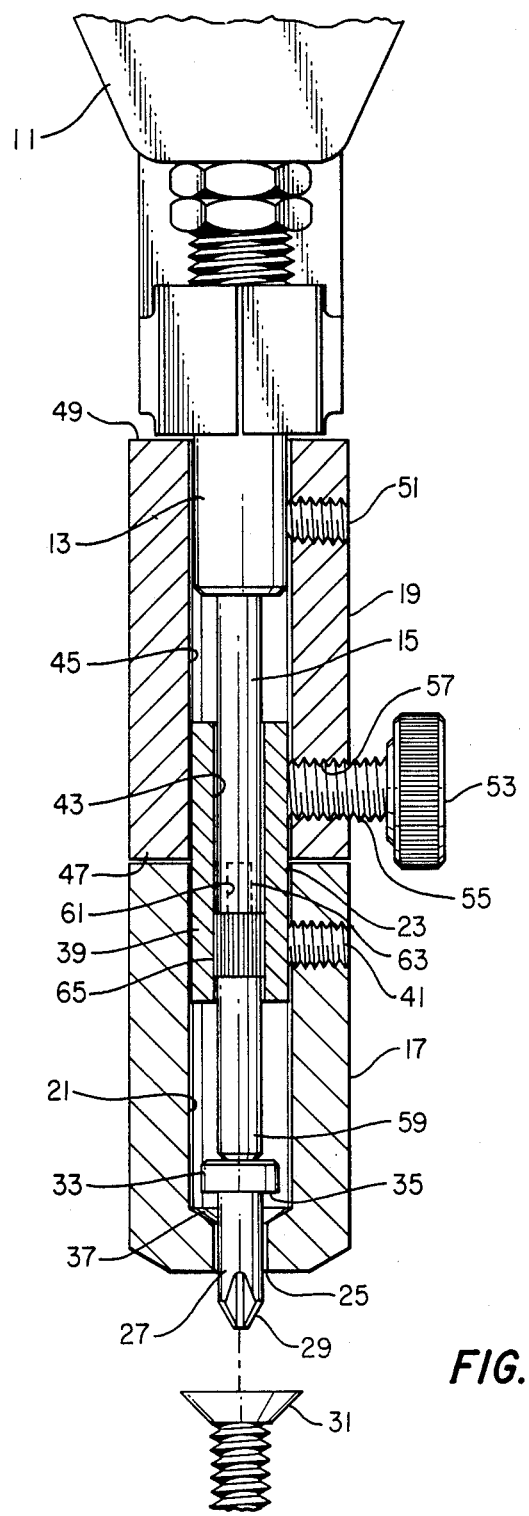
FIG. 1 is an isolated view of the gaging element housing and adapter sleeve, partially in cross-section, showing the placement thereof on the recess indicator shaft.

As shown in FIG. 2, the recess measuring device of the invention includes a recess indicator 11 which preferably provides a digital readout of the recess characteristic being measured, such as slot depth or screw head recess. The electronic indicator 11 has a tubular extension 13 from which an indicator shaft 15 extends. As will be appreciated by those skilled in the art, the recess indicator 11 is actuated by the reciprocal movement of the shaft 15 within the tubular extension 13 to record characteristics of the recess being measured. The recess indicator 11 and associated shaft 15 are known in the art and are commercially available, e.g., from Greenslade & Company, Inc. of Rockford, Ill., as the "Slot Depth Gage", SGD-0.

In order to allow for the convenient interchange of various gaging elements, the device of the invention includes a gaging element housing 17 and an associated adapter sleeve 19. The gaging element housing 17 has a generally cylindrical external configuration, an interior bore 21 (FIG. 1) and opposite end openings 23, 25. The end opening 25 is of a lesser diameter than end opening 23 and is adapted to slidably receive a gaging element 27 which, in the embodiment shown in the drawings, is a Phillips recess element. The forward end 29 (FIG. 3) of the element 27 extends at least partly from the opening 25 in the relaxed position shown in FIG. 1 for engaging a mating recess (not shown) provided in the screw head 31 (FIG. 1) to be measured. The rearward end 33 of the gaging element 27 is provided with a shoulder region 35 for engaging an internal shoulder 37 in the interior bore 21 to retain the gaging element within the bore.

A cylindrical bushing 39 is received partly within the interior bore 21 of the gaging element housing 17 and extends oppositely from the gaging element 27. The bushing 39 is sized to be slidably yet snugly received within the interior bore and is held in the position shown by means of a set screw 41. This leaves approximately one half of the overall length of the bushing 39 extending rearwardly from the gaging element housing 17. The bushing 39 is also provided with an internal bore 43.

The adapter sleeve 19 has a generally cylindrical external configuration, a cylindrical interior 45 and opposing ends 47, 49. The end 47 is adapted to be joined to the indicator 11 with the indicator shaft 15 received within the interior 45 thereof. This is preferably accomplished by engaging a set screw 51 with the tubular extension 13 of the indicator 11, when the tubular extension 13 is received within the interior 45 of the adapter sleeve. The opposing end 47 of the adapter sleeve 19 is adapted to be joined to the gaging element housing 17 with the bushing 39 being received at least partly within the interior 45. Preferably, approximately one half of the overall length of the bushing 39 is slidably yet snugly received within the interior 45 of the adapter sleeve 19.

A thumb screw 53 has a threaded shaft 55 which is received within a mating bore 57. Movement of the shaft 55 in the inward direction engages the bushing 39 to releasably join the housing to the adapter sleeve. Turning the thumb screw 53 in the outward direction releases the bushing 39, allowing the housing 17 to be removed from the adapter sleeve 19 for the easy interchange of a variety of gaging element housings.

As shown in FIG. 1, an indicator extension 59 extends from the indicator shaft 15 of the measuring device 11 through the internal bore 43 of the bushing 39 and into contact with the inner end of the gaging element 27 which is carried by the gaging element housing 17. Preferably, the extension 59 has a generally cylindrical configuration allowing the extension 59 to be slidably received within the internal bore 43 of the bushing 39. Most preferably, the indicator shaft 15 is provided with an internally threaded bore 61 which is engaged by the externally threaded shank 63 of the extension 59, whereby the indicator extension can be attached to the indicator shaft by means of a screw coupling. A knurled region 65 assists in coupling and uncoupling the indicator extension.

The operation of the device will now be described. As best seen in FIG. 3, the indicator 11 is conveniently supported on a base 67 by means of an upright member 69 and collar 71. The adapter sleeve 19 is normally retained in the position shown by securing the set screw 51 to the tubular extension 13 of the indicator. The thumb screw 53 is backed out from the bore 57 and the indicator extension 59 is coupled to the indicator shaft 15.

A gaging element housing 17 is then selected having the appropriate gaging element end 29 and the housing is installed by sliding the exposed bushing 39 into the interior 45 of the adapter sleeve 19. The housing 17 is retained in position by tightening the thumb screw 53 which contacts the bushing 39 within the interior 45.

A zeroing plate 73 (FIG. 2) can then be placed firmly and flatly against the end face 75 of the housing 17 to move the gaging element 27 and associated parts 15 and 59 to the zero position. After calibrating the indicator 11, the head of a screw 31 can be placed onto the protruding gaging element 27 and the screw head pressed firmly against the end face 75 of the housing 17. The relative distance which the gaging element 27 and associated parts 15, 59 move provides an accurate determination of the recess depth of the screw head.

An invention has been provided with several advantages. The measuring device of the invention allows quick and easy interchange of a variety of gaging elements, requiring the purchase of only a single electronic indicator. The gaging element housing captures the gaging element even during the interchange operation so that the element cannot be lost or dropped. The housing and adapter sleeve, along with the internal bushing, provide precise axial alignment of the indicator shaft and indicator extension within the device.

While the invention has been shown in only one of its forms, it is not thus limited but is susceptible to various changes and modifications without departing from the spirit thereof.

I claim:

1. A recess measuring device, comprising:
 a recess indicator having an indicator shaft extending therefrom, the recess indicator being actuable by reciprocal movement of the indicator shaft to record characteristics of the recess being measured;
 a gaging element housing having an interior bore and opposite end openings;
 a gaging element carried by the housing within the interior bore, the gaging element being extendible at least partly from one of the end openings;
 a bushing retained within the interior bore of the housing and extending from the other of the opposite end openings, the bushing having an internal bore;
 an adapter sleeve having an interior and opposing ends, one of the opposing ends being adapted to be joined to the indicator with the indicator shaft received within the interior thereof, the other of the opposing ends being adapted to be joined to the housing with the bushing received at least partly within the interior thereof;
 connector means for joining the adapter sleeve to the indicator;
 releasable means for releasably joining the housing to the adapter sleeve, whereby a plurality of interchangeable gaging element housings can be joined to the adapter sleeve;
 an indicator extension extending from the indicator shaft of the measuring device through the internal bore of the bushing and into contact with the gaging element carried by the gaging element housing, whereby movement of the gaging element moves the indicator shaft to thereby actuate the recess indicator;
 wherein the indicator shaft and indicator extension are slidably received within the bore of the bushing;
 wherein the indicator extension is attached to the indicator shaft by means of a screw coupling; and
 wherein the recess indicator further comprises a tubular extension surrounding a portion of the indicator shaft, the tubular extension being selectively sized to be received within the interior of the adapter sleeve with the indicator shaft extending therefrom, and wherein the connector means connect the adapter sleeve to the tubular extension.

2. The device of claim 1, wherein the connector means comprises at least one set screw joining the adapter sleeve to the tubular extension.

3. The device of claim 2, wherein the releasable means comprises a thumb screw for releasably joining the housing to the adapter sleeve.

* * * * *